United States Patent
Ishikawa et al.

(10) Patent No.: US 6,892,545 B2
(45) Date of Patent: May 17, 2005

(54) AUTOMATIC REFRIGERATOR SYSTEM, REFRIGERATOR, AUTOMATIC COOKING SYSTEM, AND MICROWAVE OVEN

(75) Inventors: Toshiharu Ishikawa, Tokyo-To (JP); Shigeru Nakano, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 30 days.

(21) Appl. No.: 09/959,460

(22) PCT Filed: Feb. 28, 2001

(86) PCT No.: PCT/JP01/01521

§ 371 (c)(1),
(2), (4) Date: Oct. 26, 2001

(87) PCT Pub. No.: WO01/63189

PCT Pub. Date: Aug. 30, 2001

(65) Prior Publication Data

US 2002/0157411 A1 Oct. 31, 2002

(30) Foreign Application Priority Data

| Feb. 28, 2000 | (JP) | 2000-052545 |
|---|---|---|
| Jun. 30, 2000 | (JP) | 2000-197551 |
| Jun. 30, 2000 | (JP) | 2000-197592 |
| Jan. 16, 2001 | (JP) | 2001-007112 |

(51) Int. Cl.[7] .......... F25D 23/00; G06K 19/07
(52) U.S. Cl. .......... 62/126; 62/127; 62/60; 62/161
(58) Field of Search .......... 62/161, 162, 125, 62/126, 127, 129, 130, 60, 131; 340/584, 585, 588

(56) References Cited

U.S. PATENT DOCUMENTS

| 4,323,773 A | 4/1982 | Carpenter | 235/473 |
|---|---|---|---|
| 6,121,593 A | 9/2000 | Mansbery et al. | 219/679 |
| 6,483,695 B1 * | 11/2002 | Hartstein | 361/680 |
| 6,519,963 B2 * | 2/2003 | Maeda | 62/259.2 |

FOREIGN PATENT DOCUMENTS

| DE | 28 56 122 A1 | 6/1980 |
|---|---|---|
| DE | 299 17 576 | 2/2000 |
| EP | 0 942 383 A1 | 9/1999 |
| EP | 0 965 795 A2 | 12/1999 |
| EP | 1 039 441 A2 | 9/2000 |
| JP | 61-291880 | 12/1986 |
| JP | 5-288456 | 11/1993 |
| JP | 6-137749 | 5/1994 |
| JP | 8-291914 | 11/1996 |
| JP | 9-229375 | 9/1997 |
| JP | 11-15377 | 1/1999 |
| JP | 11-118155 | 4/1999 |

(Continued)

OTHER PUBLICATIONS

Patent Abstracts of Japan, vol. 1999, No. 14, Dec. 22, 1999 & JP 11 255209 A, Sep. 21, 1999 Abstract.
Patent Abstracts of Japan, vol. 1997, No. 09, Sep. 30, 1997 & JP 09 119768 A, May 6, 1997.
Patent Abstracts of Japan, vol. 1999, No. 02, Feb. 26, 1999 & JP 10 311665, Nov. 24, 1998.

*Primary Examiner*—Harry B. Tanner
(74) *Attorney, Agent, or Firm*—Parkhurst & Wendel, L.L.P.

(57) ABSTRACT

An automatic cold-storage system includes a food package (22) provided with a noncontact IC tag (11), and a refrigerator (31) for storing the food package (22). Information is read from the noncontact IC tag (11) by a noncontact IC tag reader (12) and is compiled to a database (31c). A managing means (31b) controls the refrigerator (31) on the basis of information contained in the database (31c). The managing means (31b) makes a display device (14) display a warning on the basis of information read by the noncontact IC tag reader (12).

16 Claims, 11 Drawing Sheets

FOREIGN PATENT DOCUMENTS

| | | |
|---|---|---|
| JP | 11-230554 | 8/1999 |
| JP | 2988364 | 10/1999 |
| JP | 11-276359 | 10/1999 |
| JP | 11-325703 | 11/1999 |
| JP | 2000-65465 | 3/2000 |
| JP | 2000-310476 | 11/2000 |
| JP | 2001-41628 | 2/2001 |
| JP | 2001-109820 | 4/2001 |
| WO | WO 99/67754 | 12/1999 |

* cited by examiner

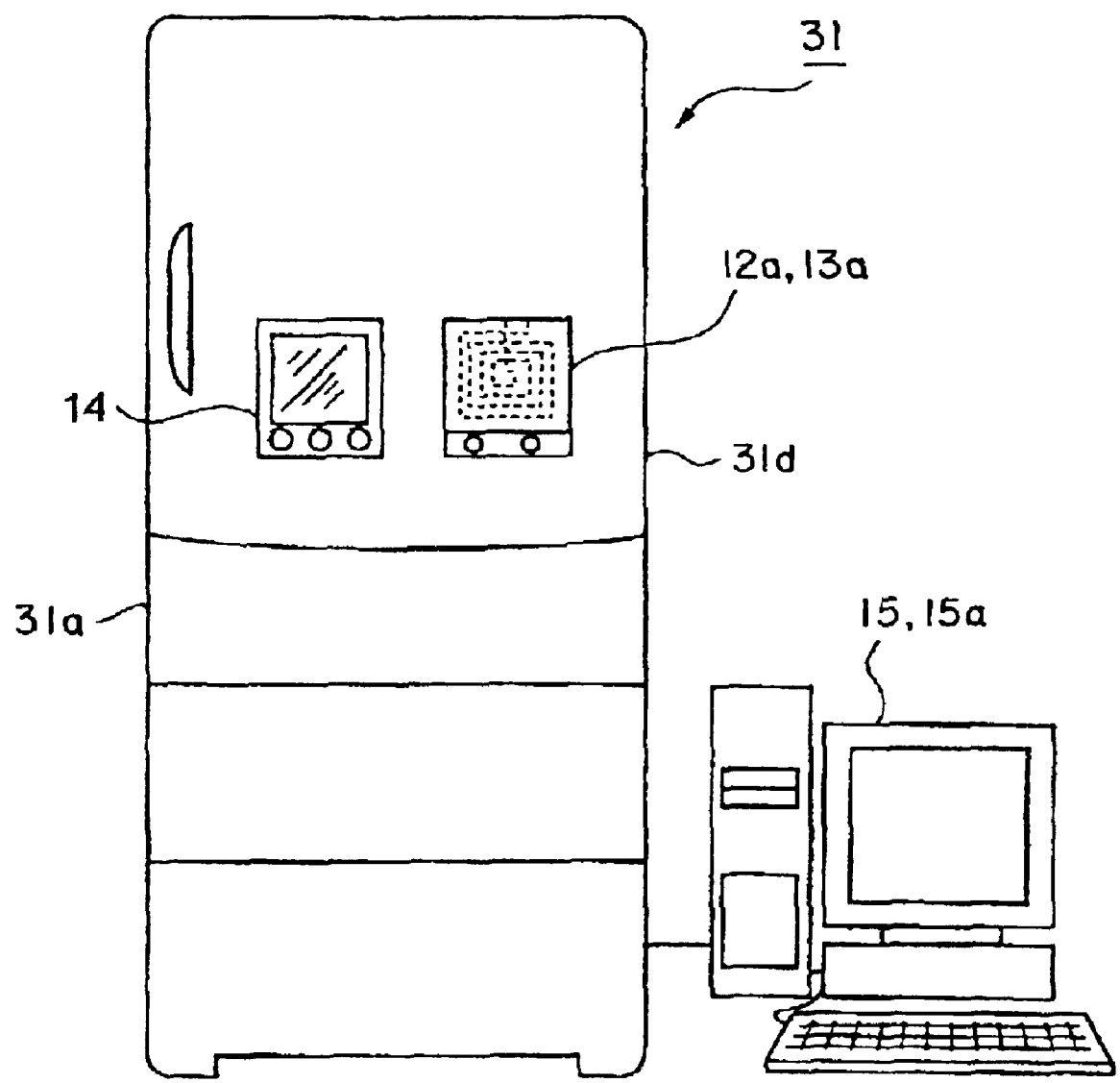
F I G. 6

| DATE OF STORAGE | PRODUCER | FOOD | QUANTITY | TIME LIMIT FOR CONSUMPTION |
|---|---|---|---|---|
| 2000.11.28 | ABC FOOD CO. | FRIED NOODLE | THREE PORTIONS | 2000.12.3 |
| 2000.11.29 | TAQ CO. | PASTA | FIVE PORTIONS | 2000.12.5 |
| 2000.12.1 | PQR SEA FOOD CO. | FRESH OYSTER | 200g | 2000.12.3 |
| 2000.12.2 | UVW AGRICULTURAL PRODUCTS CO. | POTATO | 500g | 2000.12.15 |
| 2000.12.3 | XYZ DAIRY CO. | MILK | 500ml | 2000.12.10 |
| 2000.12.5 | | | | |

FIG. 8

AUTOMATIC REFRIGERATOR SYSTEM, REFRIGERATOR, AUTOMATIC COOKING SYSTEM, AND MICROWAVE OVEN

TECHNICAL FIELD

The present invention relates to an automatic cold-storage system for cold-storing foods, a refrigerator, an automatic cooking system and a microwave oven.

BACKGROUND ART

Usually, content information, time limit for relishing or storage conditions are indicated on a food package. However, since the contents of the food package is not necessarily remembered after the food package has been stored or the contents of the food package have been cooked, it often occurs that the food package is stored beyond the time limit for relishing or the contents of the food package is cooked under wrong cooking conditions. Thus, the foods cannot be satisfactorily used.

DISCLOSURE OF THE INVENTION

The present invention has been made in view of the foregoing problem and it is therefore an object of the present invention to provide an automatic cold-storage system, a refrigerator, an automatic cooking system and a microwave oven capable of cold-storing a food package under optimum storage condition and of cooking the food contained in the food package under optimum cooking conditions on the basis of information about the contents of the food package.

According to the present invention, an automatic cold-storage system includes a food package provided with a noncontact IC tag storing information about a food contained in the food package, and a refrigerator for storing the food package; wherein the refrigerator is provided with a noncontact IC tag reader for reading the information from the noncontact IC tag, and the refrigerator has a managing means for cold-storing the food package under optimum cold-storing conditions on the basis of information read from the noncontact IC tag by the noncontact IC tag reader.

In the automatic cold-storage system, the refrigerator is provided with a display device, and the managing means makes the display device display information on the basis of the information about the food recorded on the noncontact IC tag.

In the automatic cold-storage system, the information about the food includes a time limit for consumption and a time limit for relishing the food, and the managing means makes the display device give a warning when the time limit for consumption or the time limit for relishing is drawing.

In the automatic cold-storage system, the information about the food includes a time limit for consumption, a time limit for relishing the food and the quantity of the food, and the managing means makes the display device display proposed menus or proposed articles to be purchased on the basis of the information about the time limit for consumption, the time limit for relishing and the quantity of the food.

An automatic cold-storage system includes a food package provided with a noncontact RF-ID tag storing information about the food contained in the food package, and a refrigerator for cold-storing the food package; wherein the refrigerator is provided with a noncontact RF-ID tag reader for reading the information from the RF-ID tag, and a database containing information read by the noncontact IC tag reader, and the information contained in the database can be read by an external personal digital assistant.

In the automatic cold-storage system, the information contained in the database is read through a mobile transmission network or the Internet.

A refrigerator according to the present invention for containing and cold-storing a food package provided with a noncontact IC tag includes a noncontact IC tag reader for reading information from the noncontact IC tag, and a managing means for cold-storing the food on the basis of information read from the noncontact IC tab by the noncontact IC tag reader under optimum conditions.

The refrigerator further includes a display device, and the managing means makes the display device display information on the basis of information about the food and storage conditions recorded on the noncontact IC tag.

In the refrigerator, the information about the food includes a time limit for consumption and a time limit for relishing the food, and the managing means makes the display device display the information when the time limit for consumption or the time limit for relishing is drawing.

In the refrigerator, the information about the food includes a time limit for consumption, a time limit for relishing and the quantity of the food, and the managing means makes the display device display proposed menus or proposed articles to be purchased on the basis of the information about the time limit for consumption, the time limit for relishing and the quantity of the food.

The refrigerator further includes a database containing information read by the noncontact IC tag reader.

According to the present invention, a refrigerator for containing and cold-storing a food package provided with a noncontact RF-ID tag storing information about a food contained in the food package includes a refrigerating unit, a reader attached to the refrigerating unit and capable of reading information from the noncontact RF-ID tag, and a database containing information read by the noncontact IC tag reader.

The refrigerator may, further include a display device for displaying information read from the database.

In the refrigerator, the database is included in a home server or a personal computer.

In the refrigerator, the reader is attached to the outer surface of the refrigerating unit and is capable of reading and writing operations.

In the refrigerator, the reader is disposed inside the refrigerating unit.

According to the present invention, an automatic cooking system includes a food package provided with a noncontact IC tag storing information about a food contained in the food package, and a microwave oven capable of containing the food package and of cooking the food contained in the food package, wherein the microwave oven is provided with a reader for reading the information from the noncontact IC tag, and has a cooking means to cook the food contained in the food package under optimum cooking conditions on the basis of the information read from the noncontact IC tag by the reader.

In the automatic cooking system, the microwave oven further includes a display device, and the microwave oven further includes a display device, and the cooking means makes the display device display a message that the food of the food package is not suitable for cooking when it is decided, on the basis of the information about the food recorded on the noncontact IC tag.

In the automatic cooking system, the information about the food includes a method of heating the food and an amount of heat energy for cooking, and the cooking means cooks the food contained in the food package under optimum conditions determined on the basis of the information.

In the automatic cooking system, the information about the amount of heat energy is expressed by an absolute amount of heat energy, and the cooking means adjusts an absolute amount of heat energy to be provided by the microwave oven on the basis of this information.

In the automatic cooking system, information about the amount of heat energy is represented by a symbol indicating the level of the absolute amount of heat energy, and the cooking means adjusts an absolute amount of heat energy to be provided by the microwave oven on the basis of this information.

According to the present invention, a microwave oven for containing a food package provided with a noncontact IC tag storing information about a food contained in the food package, and cooking the food contained in the food package includes a reader for reading the information recorded on the noncontact IC tag, and a cooking means for cooking the food contained in the food package under optimum cooking conditions determined on the basis of the information read from the noncontact IC tag by the noncontact IC tag reader.

The microwave oven further includes a display device, wherein the cooking means makes the display device display a message that the food of the food package is not suitable for cooking when it is decided, on the basis of the information about the food recorded on the noncontact IC tag.

In the microwave oven, the information about the food includes a method of heating the food and an amount of heat energy for cooking, and the cooking means cooks the food of the food package under optimum conditions determined on the basis of the information.

In the microwave oven, the information about the amount of heat energy is expressed by an amount of absolute heat energy, and the cooking means adjusts the amount of absolute heat energy to be provided by the microwave oven on the basis of this information.

In the microwave oven, information about the amount of heat energy is represented by a symbol indicating the level of the amount of absolute heat energy, and the cooking means adjusts the amount of absolute heat energy to be provided by the microwave oven on the basis of this information.

BRIEF DESCRIPTION OF THE DRAWINGS

FIG. 6 is a front elevation of a refrigerator in a second embodiment according to the present invention;

FIG. 8 is a list of a stock of foods;

BEST MODE FOR CARRYING OUT THE INVENTION

First Embodiment

An automatic cold-storage system in a first embodiment according to the present invention including a refrigerator will be described with reference to FIGS. 1 to 5.

The automatic cold-storage system uses noncontact IC tags attached to various foods, particularly, cooked frozen foods, such as HMRs (home meal replacements), processed foods and perishable foods.

A refrigerator according to the present invention provided with a noncontact IC tag reader for reading information from a noncontact IC tag is employed in the automatic cold-storage system. The refrigerator has, in addition to the noncontact IC tag reader, a display device, and a database including data on stored foods.

Automatic Cold-Storage System

Figure 1:
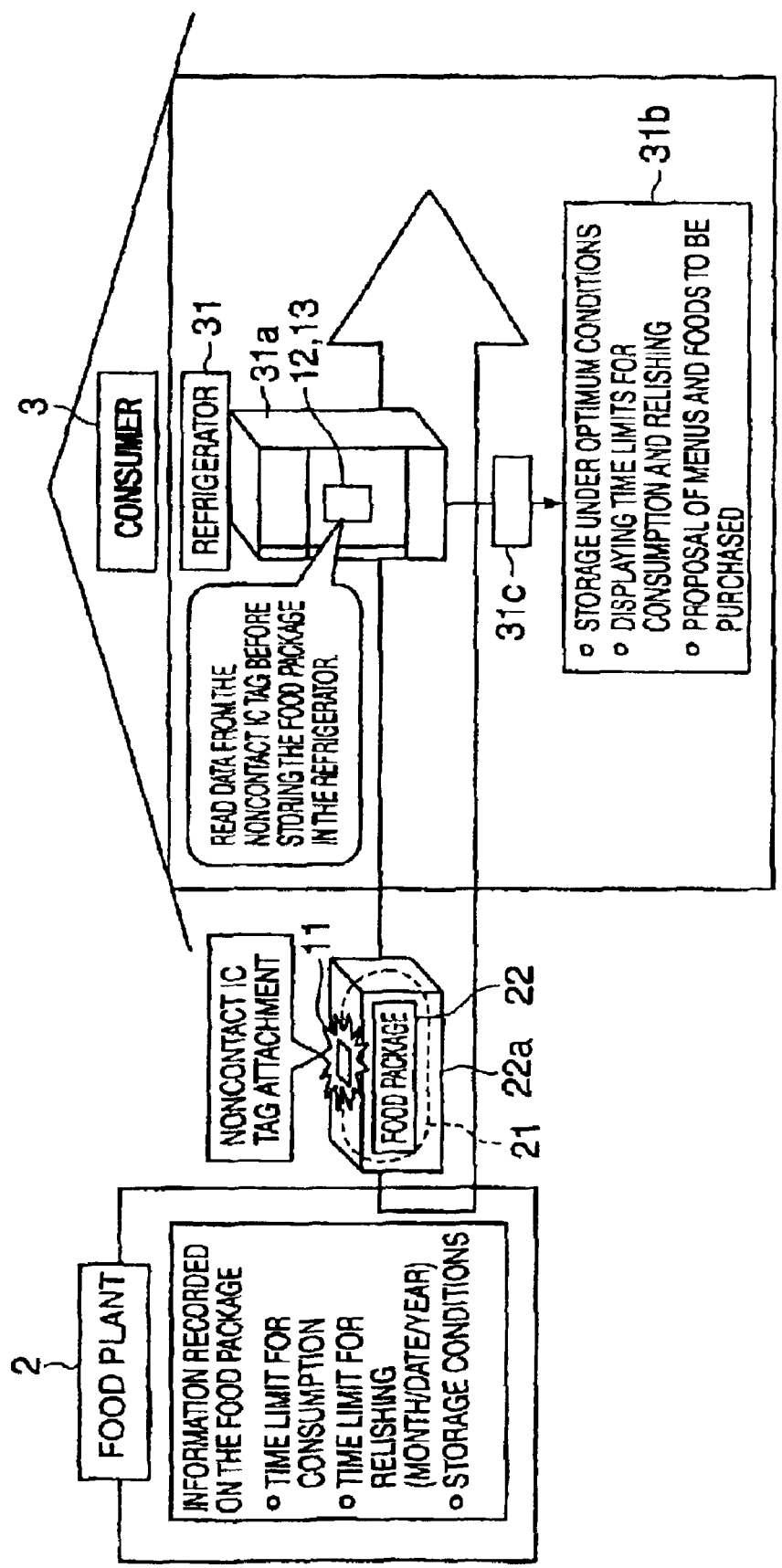
FIG. 1 is a block diagram of an automatic cold-storage system in a first embodiment according to the present invention.

FIG. 1 illustrates the automatic cold-storage system as applied to handling processed foods by way of example.

A food package 22 produced by packaging a processed food 21 in a carton 22a is shipped by a food processing plant. A noncontact IC tag 11 is attached to the carton 22a of the food package 22 before shipping. The food package 22 is distributed by a distribution system to a retailer, and a consumer 3 purchases the food package 22 from the retailer.

When the food plant 2 ships the food package 22, information about the food of the food package 22 including storage conditions, time limit for consumption, time limit for relishing, quantity and such is recorded on the noncontact IC tag 11 in addition to data on the food generally indicated on a food package of a processed food, such as product name, (kind), producer's name, manufacturing date, lot number and such.

Generally, information similar to that recorded on the noncontact IC tag 11 is indicated on the food package 22. However, since a limited area is available on the food package 22, only some of the pieces of information are indicated on the food package 22. The information storage capacity of the noncontact IC tag 11 can be increased to any desired extend.

Sometimes, the consumer 3 cooks the purchased processed food 21 directly. Normally, the purchased food package 22 containing the processed food 21 is stored temporarily in a refrigerator 31.

The refrigerator 31 is provided with noncontact IC tag readers 12 (sometimes referred to also as "antennas") for reading information from the noncontact IC tag 11. In the automatic cold-storage system, each noncontact IC tag reader 12 reads automatically the information from the noncontact IC tag 11 attached to the food package 22 when the food package 22 is put in the refrigerator 31 or periodically after the food package 22 has been stored in the refrigerator 31.

The automatic cold-storage system adjusts cold-storing conditions properly according to the information read from the noncontact IC tag 11 so as to meet specified storage conditions. If the storage conditions are improper, the automatic cold-storage system gives a warning. When the time limit for consumption or the time limit for relishing of the food package 22 is drawing (close), the automatic cold-storage system makes a display device display a warning. The automatic cold-storage system proposes menus on the basis of foods stored in the refrigerator 21, provides an inventory of foods stored in the refrigerator 31 and provides a food package purchase proposal.

Generally, the information about the food of the food package 22 recorded on the noncontact IC tag 11 and to be read by the noncontact IC tag reader 12 includes: (1) Storage date (month/date/year), (2) producer's name (producer code), (3) name of food (character string), (4) quantity of food (number of portions) (numerals), (5) cooking method, (6) storage temperature range (code), (7) time limit for consumption (month/date/year), (8) time limit for relishing (month/date/year), (9) nutrients (character string describing calorie, fats, vitamins and the like), (10) repellents (character string describing allergy and invalid diet)

Storage temperature ranges are represented by a code A for a freezing temperature range, a code B for chilling temperature range, a code E for cooling (vegetable storage) temperature range and the like.

Time limit for consumption is assigned principally to a perishable food to specify a preferable term for consumption and is, in most cases, a short time of two or three days after production. Time limit for relishing is assigned to a canned food or a boil-in-the-bag food having a comparatively long shelf life to specify a preferable term for relishing. Generally, a term limited by a time limit fore relishing for a canned food is as long as two years.

Figure 2:
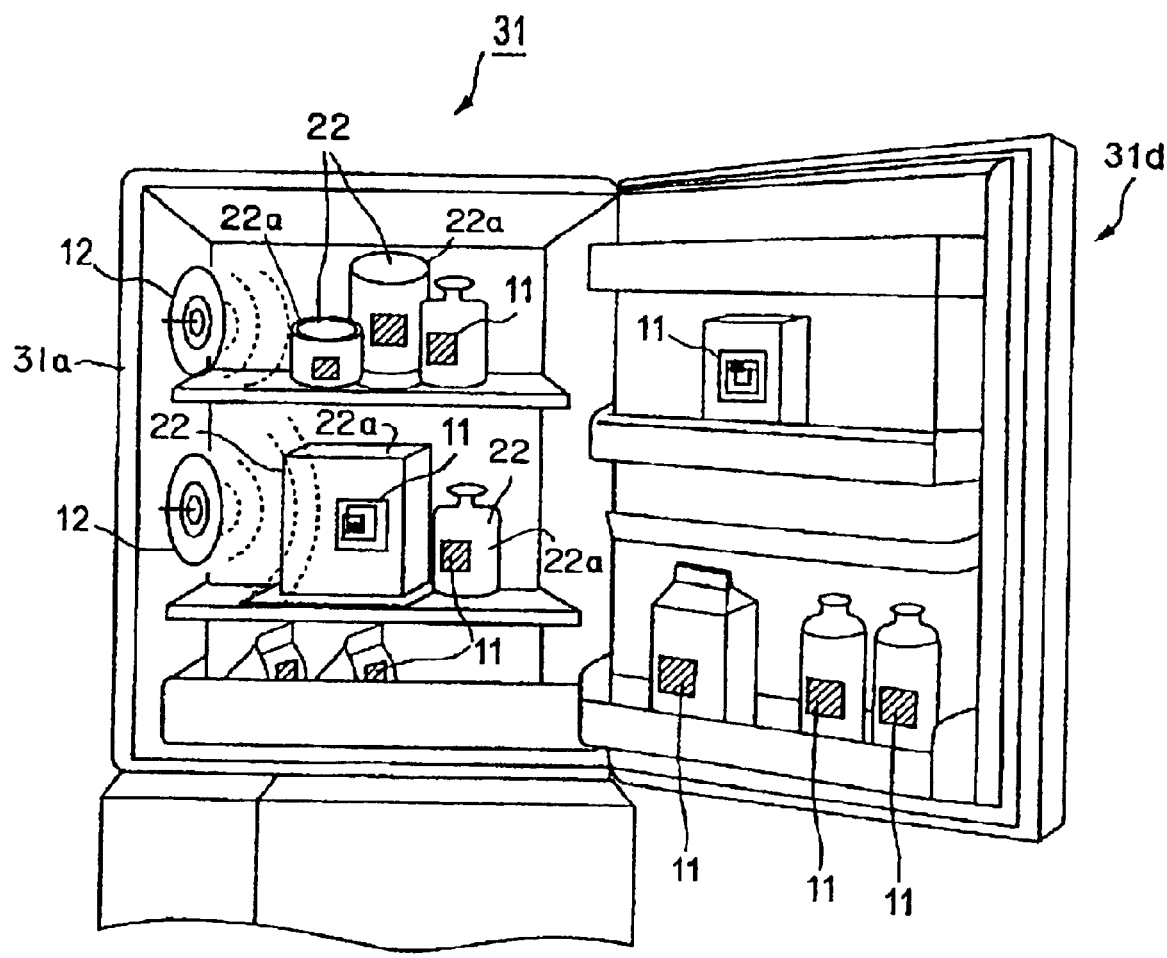
FIG. 2 is a perspective view of a refrigerator with its door open.

Referring to FIG. 2 showing the refrigerator 31, the refrigerator 31 has a refrigerating unit 31a, and a front door 31d for closing the open front side of the refrigerating unit 31a. The front door 31d is opened in FIG. 2.

Referring to FIG. 2, food packages 22 each including a carton 22a and a food 21 packaged in the carton 22a are stored in the refrigerator 31. The cartons 22a of the food packages 22 are provided with noncontact IC tags 11, respectively.

Each food package 22 is provided with a label, not shown, indicating data on the food 21 in conformity to the Food Hygiene Act and the like, and time limits for consumption and relishing are indicated on the food package 22. As a rule, data corresponding to those indicated on the label is recorded on the noncontact IC tag 11 and, generally, additional data are recorded on the noncontact IC tag 11.

The noncontact IC tag readers 12 for reading the information from the noncontact IC tag 11 are disposed inside or outside the refrigerating unit 31a of the refrigerator 31 or the noncontact IC tag readers 12 are disposed inside and outside the refrigerating unit 31a, respectively. A display device 14 is attached to the outer surface of the front door 31d. The display device 14 displays information read from the noncontact IC tag 11, warnings and the like.

The refrigerator 31 has a database 31c including information about foods read by the noncontact IC tag readers 12, and a managing means 31b for cold-storing food packages 22 on the basis of information included in the database 31c. The quantity of the stored foods is not very large, only a storage device comprised of an integrated circuit may be used for storing the database 31c.

Generally, the refrigerator 31, such as a large refrigerator or a domestic refrigerator, has a plurality of storage sections respectively for storing food packages 22 at temperatures in a plurality of temperature ranges. Therefore, the noncontact IC tag readers 12 are assigned to the storage sections, respectively. The managing means 31b controls the refrigerator 31 on the basis of information read by the noncontact IC tag readers 12 to store the food packages 22 in the storage sections in the refrigerator under optimum cold-storing conditions.

When the refrigerator 31 is a general-purpose refrigerator, the temperature ranges includes a wine storage temperature range of about 6° to 12° C., a cool storage (vegetable storage) temperature range of about 0° to 6° C., a cold storage temperature range of about −2° to 2° C., chill storage temperature range of about −1° to −5° C., a half-frozen storage temperature range of about −5° to −9° C. and a frozen storage temperature range of about −17° to −21° C. The managing means 31b makes the display device 14 display a warning if a food package is put in the storage section of a storage temperature range not meeting the storage temperature condition for the food package.

For example, fruit is able to maintain its intrinsic taste when stored at temperatures in the half-frozen storage temperature range, and is frozen hard and looses its taste and flavor if the same is stored at temperatures in the frozen storage temperature range.

The possible term of preservation of raw tuna is about one month when the raw tuna is frozen, fourteen days when half-frozen, and about four or five days when cold-stored or chilled.

The managing means 31b makes the display device 14 display a warning on the basis of information read by the noncontact IC tag reader 12 when the expiration of the possible term of preservation estimated taking into consideration the storage conditions of the storage section storing the food package. The warning is displayed, for example, in red letters on the display device 14 on, for example, a liquid crystal display panel.

Generally, the time limit for relishing is not indicated on the label attached to the food package 22 and is indicated, in most cases, by date printed on a side wall or the bottom wall of the carton 22a of the food package 22. Data on the time limit for relishing may be recorded on the noncontact IC tag 11 and the managing means 31b may make the display device 14 of the refrigerator 31 display the approach of the time limit for relishing.

Optimum conditions for storing the food 21 in the refrigerator 31 is determined taking into consideration the ingredients of the processed food 21 and the functions of the refrigerator 31. Fruit must be stored at temperatures that will not freeze the fruit. Diary products and fruit are not frozen and maintain their taste and flavor when the same are stored at temperatures in the cold storage temperature range. However, if the refrigerator 31 does not have a storage section for the cold storage temperature range, diary products and fruit are stored unavoidable under other storage conditions. Refrigerating conditions for the food 21 is dependent on the term of preservation of the food 21. As mentioned above, the possible term of preservation of sliced meat, similarly to that of raw tuna, is about one month when the sliced meat is frozen, twenty days when half-frozen, about six to fourteen days when chilled, and seven or eight days when chilled. Thus conditions for preservation are dependent on the term of preservation and the functions of the refrigerator. Optimum preservation conditions are determined taking those conditions into consideration.

A noncontact IC tag reader/writer 13 may be disposed on the front door 31d of the refrigerator 31. The noncontact IC tag reader/writer 13 is necessary for writing data to the noncontact IC tag 11. A person purchased a food 21 is able to write necessary information including a desired term of preservation and a message to inhibit the use of the food 21 by another person to the noncontact IC tag 11 before putting the food 21 in the refrigerator 31. The noncontact 11 tag reader/writer 13 is necessary also for entering information about perishable foods, such as raw fishes and vegetables, not provided with the noncontact IC tag 11.

Preferably, the noncontact IC tag reader/writer 13 is disposed on the front door 31d of the refrigerator 31 for the convenience of the consumer. When the noncontact IC tag reader/writer 13 is disposed on the front door 31d, the information recorded on the noncontact IC tag 11 can be read by the noncontact IC tag reader/writer 13 before putting the food package 22 in the refrigerator 31. Since the noncontact IC tag 11 can be held close to the noncontact IC tag reader/writer 13 to read the information from the noncontact IC tag 11 and to write data to the noncontact IC tag 11, data can be written to the noncontact IC tag 11 by low writing power even if the communication distance of the noncontact IC tag 11 is long.

When information is read from the noncontact IC tag 11 by the noncontact IC tag reader/writer 13 before putting the food package 22 in the refrigerator 31, the same information is read again by the noncontact IC tag reader 12 disposed in the refrigerator 31. However, since the food package 22 is specified, as a rule, by an unduplicated ID code and data specified by the same ID code as that specifying data previously entered into the database 31c is deleted, the managing means 31b of the refrigerator 31 does not recognize faultily the same food package 22 to be two different food packages.

Accordingly, if food packages 22 are different, each food packages 22 containing the same food and produced on the same date of manufacture are provided with different ID codes, respectively.

The refrigerator 31 is not different from ordinary refrigerators at all, except that the refrigerator 31 has the managing means 31b capable of optimum cold-storing conditions on the basis of the information read from the noncontact IC tag 11, and of making the display device 14 display a warning when the cold-storing conditions are inappropriate.

Optimum conditions for food packages of the same kind are set conditions where when food packages of the same kind are stored in a predetermined section of the refrigerator 31, the food packages of the same kind can be properly cold-stored.

When the refrigerator 31 is an ordinary domestic refrigerator, a plurality of food packages 22 are stored in storage sections adjusted to specific storage conditions, respectively, and hence the storage conditions are not necessarily suitable for all the food packages stored in the refrigerator 31. In such a case, warnings may be displayed to that effect.

The interior of the refrigerator 31 may be divided into storage sections and fixed storage conditions may be set for the storage sections, respectively, or the storage conditions for the food packages 22 may be variable.

A proposal for menus and a proposal to purchase foods are made on the basis of the information about the food packages 22 stored in the refrigerator 31. For example, when the stored food packages 22 includes canned foods and boil-in-the-bag foods approaching close to their time limits for relishing, the managing means 31b proposes the use of those foods and menus which needs those foods. When the amount of food, which is used regularly, such as eggs or milk, diminishes, the managing means 31b makes a proposal to purchase the food. The managing means 31b makes the display device 14 display the contents of the proposal.

Noncontact IC Tag

The noncontact IC tag 11 has an LC resonance circuit formed on a plastic base and including an antenna and a capacitor. The noncontact IC tag 11 responds to a microwave of a specific frequency.

Generally, a radio wave of 125 kHz, 13.56 MHz, 2.45 GHz or 5.8 GHz (microwave) is used for operating the noncontact IC tag 11.

Figure 3:
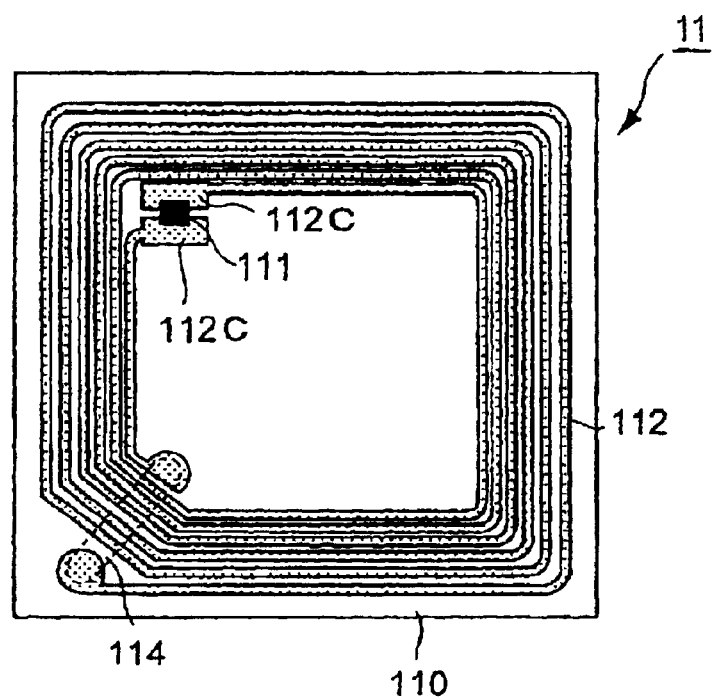
FIG. 3 is a plan view of a noncontact IC tag.

Referring to FIG. 3, the noncontact IC tag 11 includes a base 110 of a plastic material or the like, an antennal pattern 112 formed on the base 110, and an IC chip 111 connected to the antenna pattern 112. The antenna pattern 112, and a capacitor included in the IC chip 111 form a resonance circuit. The noncontact IC tag 11 sends out information stored therein upon the reception of a radio wave of a specific frequency.

As shown in FIG. 3, a conductive member 114 forms a jumper circuit on the back surface of the base 110 and the antenna pattern 112 is connected to bumps formed on the back surface of IC chip 111 by coil connecting terminals 112C.

The noncontact IC tag 11 is fabricated by forming the antenna pattern 112 by subjecting a metal foil, such as an aluminum foil, laminated to the resin base 110 to photolithographic etching processes or to resist printing and etching processes, mounting the IC chip 111 on the base 110, and covering the antenna pattern 112 and the IC chip 111 with a protective film. The size of the noncontact IC tag 11 may be 30 mm sq. or below or on the order of 100 mm sq.

The base 110 of the noncontact IC tag 11 is formed of any one of PET resins, polypropylene resins, polyethylene resins, polystyrene resins, nylons and the like. The base 110 may be formed of paper. The thickness of the base 110 is in the range of 15 to 300 $\mu$m. Preferably, the thickness of the base 110 is in the range of 20 to 100 $\mu$m in view of strength, workability and cost.

Although the metal foil may be an aluminum foil, a copper foil or an iron foil, an aluminum foil of a thickness in the range of about 6 to about 50 $\mu$m is preferable in view of cost and workability.

Figure 4:
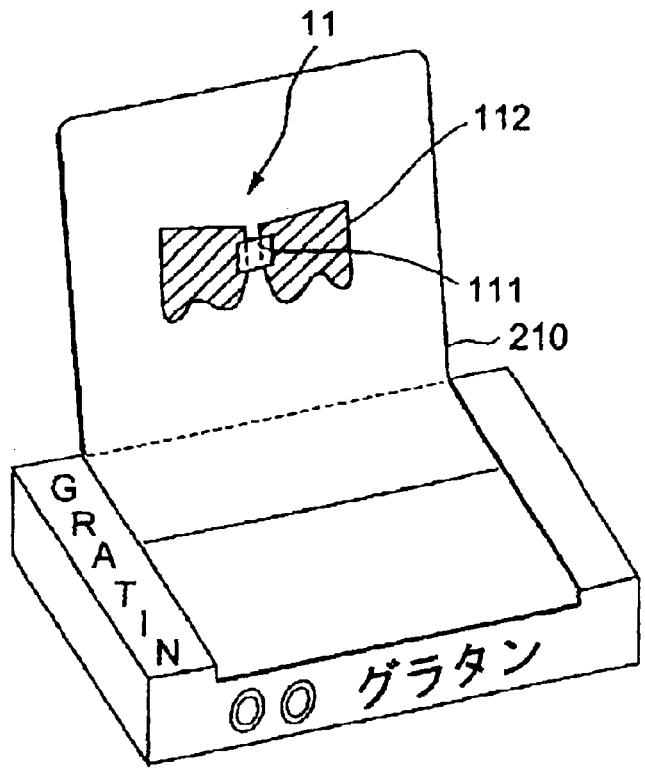
FIG. 4 is a perspective view of a carton provided with a noncontact IC tag in another embodiment.

FIG. 4 shows another possible noncontact IC tag 11.

The noncontact IC tag 11 shown in FIG. 3 is a general-purpose noncontact IC tag. The noncontact IC tag 11 to be attached to the food package may be of a simpler configuration.

For example, the simple noncontact IC tag 11 as shown in FIG. 4 can be satisfactorily put to practical use. The noncontact IC tag shown in FIG. 4 is fabricated by printing an antenna pattern (antenna) 112 with a conductive ink on a wall of a base 210 of a carton 22a, and mounting an IC chip 111 on the antenna.

The antenna pattern 112 of the noncontact IC tag 11 shown in FIG. 4 is formed directly on the wall of the carton 22a by a silk-screen printing process, an offset printing process or a gravure printing process, and attaching the IC chip 111 mounted on a tack label to the antenna 112.

A noncontact IC tag 11 integrally including an antenna and a storage, device may be mounted on a tack sheet and the tack sheet holding the noncontact IC tag 11 may be applied to a cardboard sheet or a soft packaging material for forming the carton 22a. The noncontact IC tag 11 can be attached to a molded carton 22a by an in-mold labeling process in which the noncontact IC tag 11 is placed in a mold for molding the carton 22a.

Refrigerator

Figure 5:
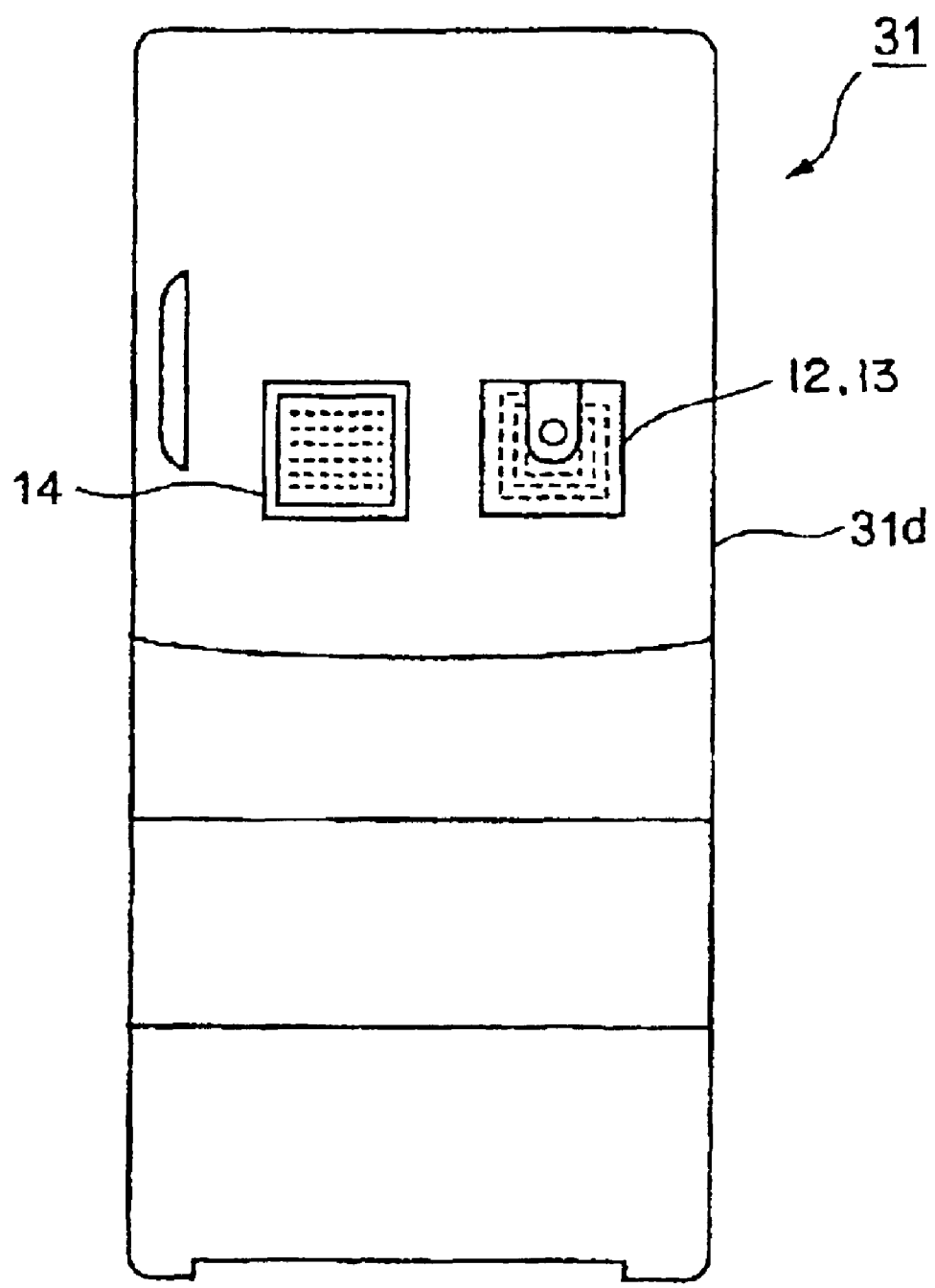
FIG. 5 is a front elevation of a refrigerator according to the present invention.

Referring to FIG. 5, the refrigerator 31 included in the automatic cold-storage system in the first embodiment is provided with the antenna-type noncontact IC tag reader 12 in the refrigerating unit 31a or on the front door 31d, or with the antenna-type noncontact IC tag readers 12 in the refrigerating unit 31a and on the front door 31d. In the refrigerator 31 shown in FIG. 5, the noncontact IC tag reader/writer 13 and the display device 14 are placed on the front door 31d.

Preferably, the display device 14 is a liquid crystal display capable of displaying information about foods stored in the refrigerator 31, and time limit for relishing of the foods and necessary warnings. The noncontact IC tag reader/writer 13 is capable of reading information from and writing data to the noncontact IC tag 11. Preferably, the noncontact IC tag reader/writer 13 is provided with a numeric keypad for entering date and such in the noncontact IC tag 11.

The consumer stores a food package 22 provided with a noncontact IC tag 11 in the refrigerator 31. When the noncontact IC tag reader/writer 13 is placed on the front door 31d of the refrigerator 31, data on the food package 22 can be entered simply by holding the food package 22 opposite to the noncontact IC tag reader/writer 13 on the front door 31d. The data thus entered is accumulated in the database 31c. The antenna-type noncontact IC tag reader 12 is provided with a scanning device capable of sending a radio wave of a frequency corresponding to the resonance frequency of the noncontact IC tag 11 to the noncontact IC tag 11, and of receiving response waves from the noncontact IC tag 11 attached to the food package 22 to read information from the noncontact IC tag 11.

The antenna-type noncontact IC tag reader 12 may be of an electromagnetic induction system, an electromagnetic coupling system or an electrostatic coupling system depending on a communication system employed, or may be of a composite system.

The antenna-type noncontact IC tag reader 12 placed in the refrigerator 31 needs a communication distance in the range of about 50 to 100 cm. Therefore, the antenna-type noncontact IC tag reader 12 must be a microwave type or a near-field type (IEC15693, ISO).

When the antenna-type noncontact IC tag reader 12 is placed in the refrigerator 31, the antenna-type noncontact IC tag reader 12 is combined with a plastic molding by in-molding and is covered with a plastic film so that metal parts thereof are not exposed to prevent the rusting of the metal parts by the agency of moisture in the refrigerator 31.

Since many food packages 22 of different kinds are stored in the refrigerator 31, all the food packages 22 must be provided with nonduplicating ID codes, respectively.

Data collision occurs when many noncontact IC tags 11 respond simultaneously. There have been previously proposed many methods of sequentially communicating with the noncontact IC tags, including a method disclosed in JP-A No. Hei 8-36623, to avoid data collision.

EXAMPLES

Use 1: Consumption Time Limit Alarm

An antenna pattern 12 of a conductive ink containing carbon pigment was formed by a silk-screen printing process on a surface of a cardboard sheet and the printed antenna pattern 12 was dried. The surface of the cardboard sheet provided with the antenna pattern 12 forms an inner surface of a carton formed by processing the cardboard sheet.

An IC chip mounted on a tack label (Bistatix, 1 kB, Motorola) 111 was put on the IC chip connecting terminals of the antenna pattern 112 to complete a carton 22a provided with a noncontact IC tag 11.

A frozen food 21 was packed in the carton 22a to produce a food package 22. Numeric characters "000715" indicating time limit for consumption of Jul. 15, 2000 were written to the noncontact IC tag 11.

The food package 22 was held opposite to the noncontact IC tag reader/writer 13 placed on the front door 31d of the refrigerator 31 before putting the food package 22 in the refrigerator 31 to read data recorded on the noncontact IC tag 11. The data read from the noncontact IC tag 11 was entered into the database 31c and the time limit for consumption was displayed on the display device 14.

Thus the use of the food which has been stored beyond the time limit for consumption can be avoided, food poisoning by rotten foods can be prevented, and loss of foods due to forgetting the storage of the foods can be reduced.

Use 2; Stock Management

A carton 22a provided with a noncontact IC tag 11 was fabricated by the same method as that mentioned above in connection with the explanation of Use 1.

A frozen food 21 was packed in the carton 22a to produce a food package 22. Data representing producer's name "DN Food", name of article "gratin", quantity "two portions", cooking method "heating for 5 min in an oven", storage temperature range "frozen" and time limit for consumption "000812" were recorded on the noncontact IC tag 11.

The data recorded on the noncontact IC tag 11 was read by the noncontact IC tag reader/writer 13 and storage date was written to the noncontact IC tag 11 by a timer when putting the food package 22 containing the frozen food 21 in the refrigerator 31.

Information about the food package 22 was entered into the database 31c of the refrigerator 31 and the information about the food package 22 and the time limit for consumption were displayed on the display device 14.

All the information included in the database 31c can be displayed to enable the consumer to obtain the information about the food packages stored in the refrigerator and to use the information as reference when making a shopping list.

Use 3: Indication of Storage Temperature

A carton 22a provided with a noncontact IC tag 11 was fabricated by the same method as that mentioned above in connection with the explanation of Use 1.

A frozen food 21 was packed in the carton 22a to produce a food package 22. Data representing producer's name "DN Food", name of article "gratin", quantity "two portions", cooking method "heating for 5 min in an oven", storage temperature range "frozen" and time limit for consumption "1000812" were recorded on the noncontact IC tag 11.

The data recorded on the noncontact IC tag 11 was read by the noncontact IC tag reader/writer 13 when putting the food package 22 containing the frozen food 21 in the refrigerator 31. When the food package 22 was put in a drawer in the cool storage section, an alarm (warning) indicating that the food package 22 was stored in a wrong storage section was displayed on the display device 14. Thus, even if the consumer stores the food package 22 wrongly in the refrigerator 31, the alarm notifies him or her immediately that the food package 22 was stored wrongly, so that wasting the food due to long, wrong storage of the same can be avoided.

As apparent from the foregoing description, the automatic cold-storage system in the first embodiment uses effectively the information recorded on the noncontact IC tag incorporated into a food package for storing the food package in the refrigerator. Therefore, failure in storing the food package due to faulty condition setting can be avoided and the food package can be stored always under optimum conditions in the refrigerator. Since the information about a food package stored in the refrigerator is contained in the database, the correct inventory of foods stored in the refrigerator can be always known, time limits for consumption of the foods stored in the refrigerator can be surely known, and hence the purchase of a uselessly large amount of food packages and the wasteful disposal of the food packages can be avoided.

Second Embodiment

A refrigerator 31 provided with a database storage device, in a second embodiment according to the present invention will be described with reference to FIGS. 6 to 10. As shown in FIG. 6, the refrigerator 31 provided with the database storage device is provided with RF-ID tag readers 12a.

Figure 7:
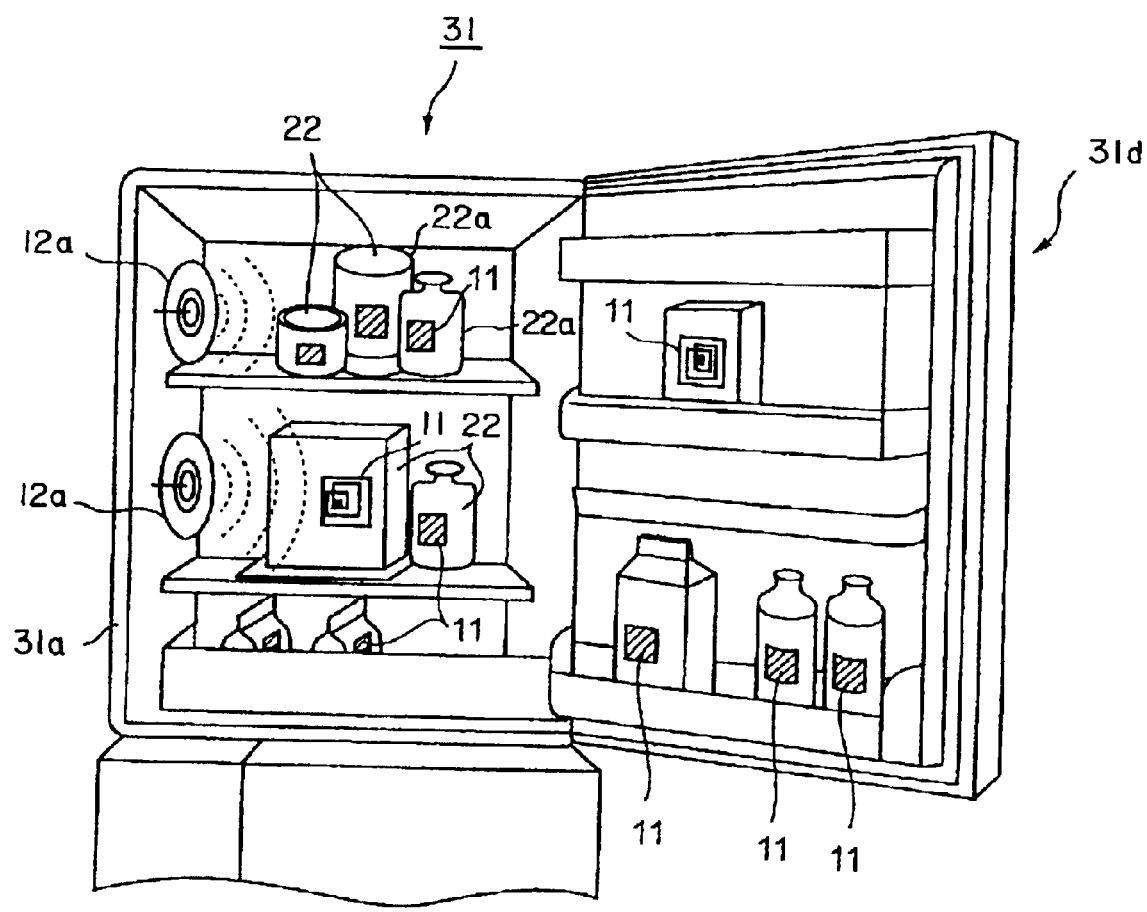
FIG. 7 is a perspective view of a refrigerator with its door open.

Referring to FIGS. 6 and 7, the refrigerator 31 has a refrigerating unit 31a and a front door 31d. The RF-ID tag readers 12a are disposed in the interior of the refrigerating unit 31a and on the front door 31d. The outside RF-ID tag reader 12a may be attached to a side surface of the refrigerator 31 or may be disposed near the refrigerator 31 instead of attaching the same to the front door 31d. A RF-ID tag reader/writer 13a capable of reading information from a RF-ID tag and of writing data to the RF-ID tag may be attached to the front door 31d. The RF-ID tag reader/writer 13a is provided with a numeric keypad for entering data representing the residual amount of foods and date. Although the outside RF-ID tag reader 12a or the RF-ID tag reader/writer 13a are optional devices and are dispensable, the inside RF-ID tag readers 12a disposed in the refrigerating unit 31a are indispensable.

A display device 14 is placed on the refrigerating unit 31a. Preferably, the display device 14 is a liquid crystal display capable of displaying information about food packages 22 stored in the refrigerator 31, and time limits for consumption of the food packages, storage date and necessary warnings. The display device 14 may be attached to a side surface of the refrigerator 31 or may be disposed near the refrigerator 31 instead of attaching the same to the front door 31d.

The consumer puts a food package 22 provided with a RF-ID tag 11 in the refrigerator 31. When the RF-ID tag reader/writer 13a is placed on the front door 31d of the refrigerator 31, he or she holds the food package 22 opposite to the RF-ID tag reader/writer 13a. Thus information recorded on the RF-ID tag 11 is entered into a home server or a database 15a held in a personal computer 15. The RF-ID tag reader/writer 13a placed on the front door 31d of the refrigerator 31 can be used for reading information not only when putting a food package 22 in the refrigerator but also when returning a food package 22 into the refrigerator 31 after using part of the food of the food package 22 and rewriting the amount of the residual food of the food package 22. When putting a new food package 22 in the refrigerator 31, the refrigerator 31 recognizes an ID code recorded on the RF-ID tag 11, and records the storage date of the food package 22 on the database 15a on the basis time data provided by a timer included in the refrigerator 31. The storage date may be entered by operating keys by hand.

The RF-ID tag reader 12a placed in the refrigerator 31 reads information about the food package 22 put in the refrigerator 31. Duplication of data is avoided by the ID code recorded on the RF-ID tag 11, so that the duplicate entry of the same food package 22 in the database 15a does not occur.

The display device 14 displays information about foods, contained in the database 15a. Therefore the consumer is able to know whether or not a desired fool package is stored in the refrigerator 31 without opening the refrigerator 31.

As shown in FIG. 6, the refrigerator 31 includes a home server or a personal computer 15. The consumer is able to access the database 15a held in the home server or the personal computer 15. The home server or the personal computer 15 may be connected to domestic electric appliances other than the refrigerator 31 to control and manage the same.

The home server or the personal computer 15 may be placed in the refrigerating unit 31a or may be separated from the refrigerating unit 31a.

Figure 9:
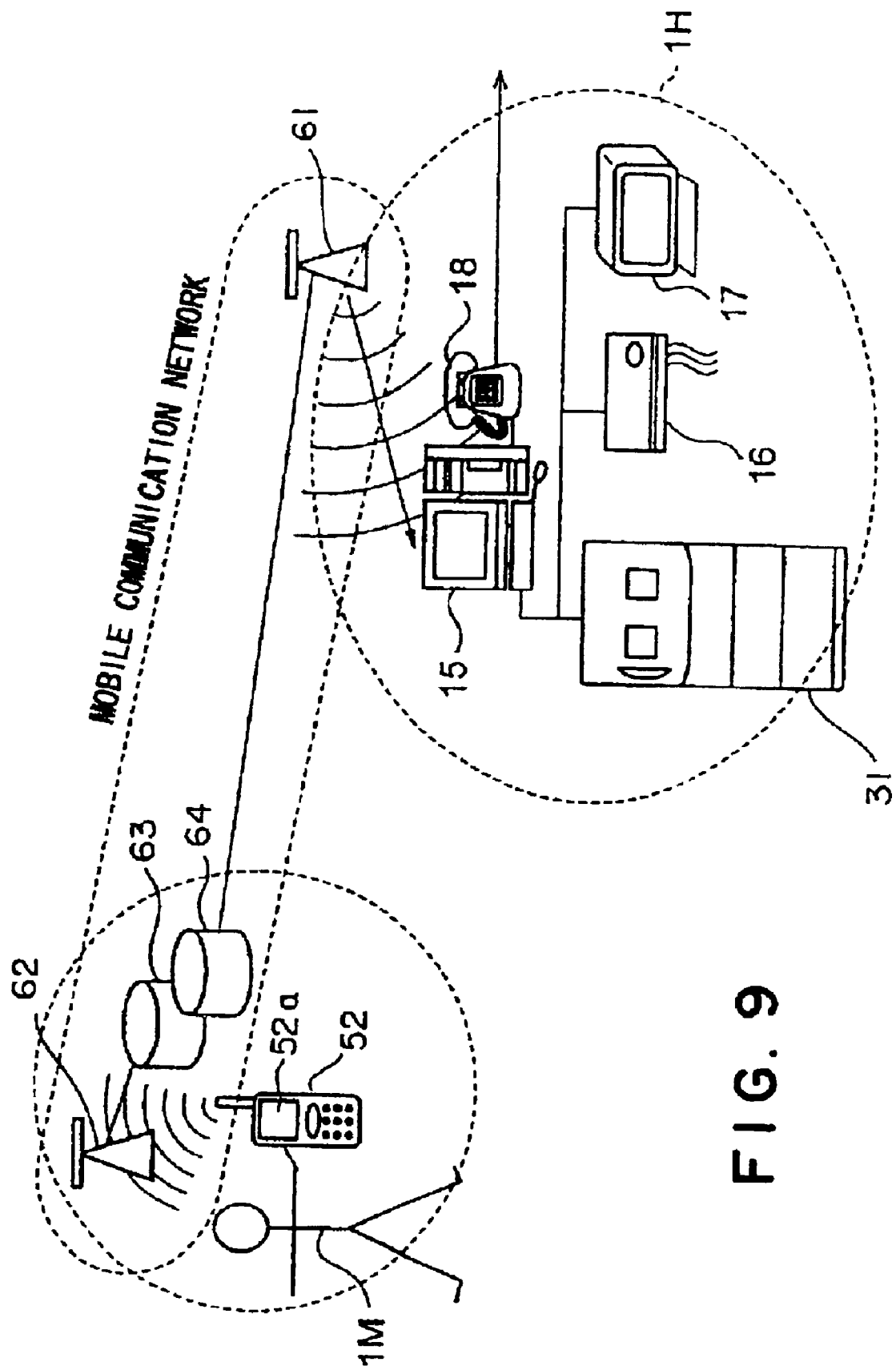
FIG. 9 is an illustration of assistance in explaining a remote stock inquiry system using a personal digital assistant for inquiring stocks in a refrigerator.

The home server or the personal computer 15 is able to respond to an external inquiry. For example, when the consumer inquired of the home server while the consumer is shopping and received a response from the home server, the response can be displayed on a display 52a included in a personal digital assistant 52 (FIG. 9).

Food packages 22 shown in FIG. 7 are provided with RF-ID tags 11 on their cartons 22a, respectively.

A label, not shown, indicating data on a food contained in the carton 22a of the food package 22 in conformity to provisions of the Food Hygiene Act is attached to each food package 22, and a time limit for consumption, a time limit for relishing and storage conditions are indicated on the carton 22a of the food package 22. As a rule, data indicated on the label is recorded on the RF-ID tag 11 and additional data is recorded also on the RF-ID tag 11.

The RF-ID tag reader 12a includes an antenna and a main circuit. The main circuit generates, modulates and demodulates radio waves. Only the antenna is shown in FIG. 2. Information can be efficiently read from the RF-ID tag 11 by the RF-ID tag reader 12a when planes respectively including the antenna and the RF-ID tag 11 are parallel. However, the information can be read from the RF-ID tag 11 even if the planes are not parallel.

Once the food package 22 is put in the refrigerator 31 for storage, information is read from the RF-ID tag 11 and the information is entered into the database 15a, the RF-ID tag reader 12a sends a radio wave of a frequency corresponding to the resonance frequency of the RF-ID tag 11 regularly to the RF-ID tag 11, and receives responses from the food package 22 provided with the same RF-ID tag 11. If any response cannot be received, it is decided that the food package 22 has been consumed and the database 15a is amended to that effect.

Data on the food package 22 that does not respond to the radio wave sent out by the RF-ID tag reader 12a is not erased immediately from the database 15a, and the date of consumption of the food package 22 is held in the database 15a and is displayed for some time, because it is necessary to know the process of consumption. Data obtained by adding up the amounts of foods consumed in the past is useful for estimating the mode of nourishment ingestion and taste for food of the family, and for calculating food expenses.

It is preferable to place the RF-ID tag readers 12a in all the compartments between the shelves to find the positions of the food packages 22 in the refrigerator 31 and to read data on the food packages 22 stored at different positions in the refrigerator 31 without fail. The position of the food package 22 can be estimated from the intensity of a response radio wave.

The antenna of the RF-ID tag reader 12a is of an electromagnetic induction system, an electromagnetic coupling system, an electrostatic coupling system depending on a communication system employed or may be a composite system.

The antenna of the RF-ID tag reader 12a placed in the refrigerator 31 needs a communication distance in the range of about 50 to 100 cm. A communication frequency of 13.56 MHz, 125 kHz, 2.45 GHz or 5.8 GHz is used.

When the RF-ID tag reader 12a is to be placed in the refrigerator 31, the antenna of the RF-ID tag reader 12a is combined with a plastic molding by in-molding and is covered with a plastic film so that metal parts thereof are not exposed to prevent the rusting of the metal parts by the agency of moisture in the refrigerator 31.

Since many food packages 22 of different kinds are stored in the refrigerator 31, the RF-ID tags 11 of all the food packages 22 must be provided with nonduplicating ID codes, respectively. Generally, different ID codes are given to RF-ID tags 11, respectively, when manufacturing the RF-ID tags 11. Therefore, as a rule, food packages 22 provided with RF-ID tags 11 having the same ID code are not stored simultaneously in the refrigerator 31. Thus, even if a plurality of food packages of the same brand and the same quality are stored simultaneously in the refrigerator, those food packages must be discriminated from each other by the different ID codes and the amount of the stocked food packages must be known.

Data collision occurs when many RF-ID tags 11 respond simultaneously to call signals sent out by the RF-ID tag readers 12a and the RF-ID tag reader/writer 13a. There have been previously proposed many communication methods of sequentially communicating with the RF-ID tags 11 to avoid data collision.

Food data on the food packages stored in the refrigerator 31 read by the RF-ID tag readers 12a is added to the database 15a. The refrigerator 31 may be provided with a computer including a storage device. The database 15a may be held in a home server or a personal computer 15. Data contained in the database 15a is displayed on the display device 14.

FIG. 8 is a list of a stock of food packages 22, in which the food packages 22 are listed in order of storage date. The food packages 22 may be listed in optional order, such as in order of time limit of consumption. The order of arrangement of the food packages 22 on the list can be selectively determined. A specific food can be retrieved. Only a limited space is available for the list. The list shown in FIG. 8 indicates only storage date, producer's name, name of article, time limit for consumption, and quantity (number of portions). If necessary, it is preferable that the list can be laterally scrolled to indicate additional items, such as nutrients, repellents and menus.

FIG. 9 illustrates a refrigerated stock inquiry system (automatic cold-storage system) including a personal digital assistant.

A user 1M uses a personal digital assistant 52, which is similar to a portable telephone, to inquire of a refrigerator 31 about information about foods.

When a mobile communication network is used, a regional station in a zone including a home 1H, and a regional station 62 in a zone including the place where the user 1M is staying constitute a mobile communication network MN. The user 1M specifies a home server 15 through a station controller 63, an exchange 64 and the mobile communication network MN to access the refrigerator 31. Domestic electric appliances, such as an air conditioning system 16 and a monitor 17, other than the refrigerator 31 can be connected to the home server 15. The user 1M can access the home server 15 through the personal digital assistant 52, the Internet and a telephone 18 by specifying an address.

A RF-ID tag 11 attached to a food package 22 will be described. The RF-ID tag 11 may be identical with the noncontact ID tag 11 shown in FIG. 3.

The RF-ID tag 11 is fabricated by forming an antenna pattern 112 by subjecting a metal foil, such as an aluminum foil, laminated to a base 110 to photolithographic etching processes or to resist base 110. The size of the noncontact IC tag 11 may be 20 mm sq. or below or on the order of 100 mm sq.

Figure 10:
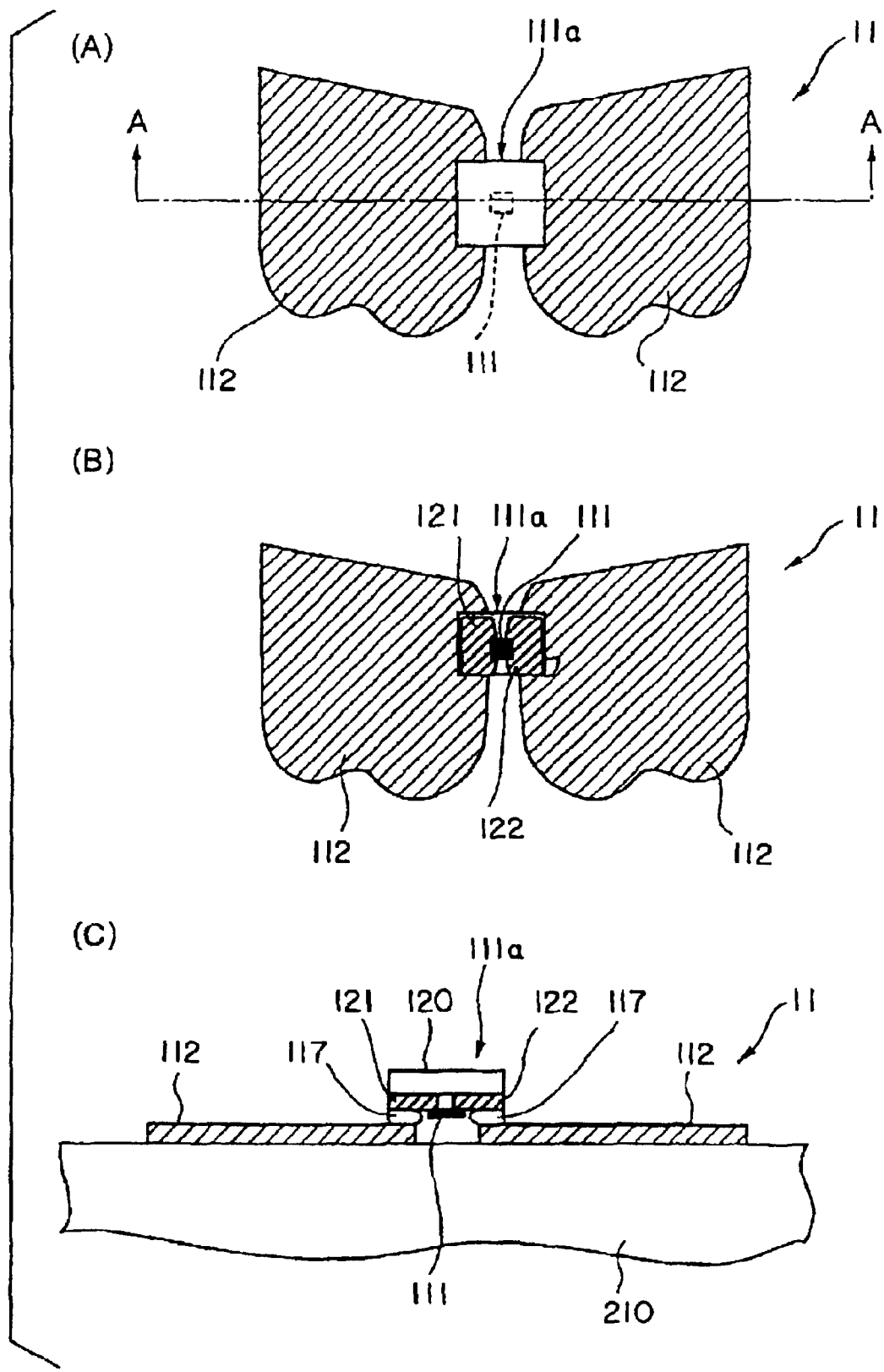
FIG. 10 is a view of a RF-ID tag in an embodiment.

FIG. 10 shows another possible RF-ID tag 11. FIG. 10(A) is a plan view of the RF-ID tag 11, in which an IC chip label 11a is attached to a pair of antenna patterns 112. FIG. 10(B) shows the RF-ID tag 11, in which the IC chip label is partly peeled off the pair of antenna patterns 112. FIG. 10(C) is an enlarged sectional view taken on line A—A in FIG. 10(A).

The RF-ID tag 11 is fabricated by printing the antenna patterns 112 directly on the base 110 formed by cutting a cardboard sheet, and attaching the IC chip label 111a to the antenna patterns 112.

The antenna patterns 112 of the RF-ID tag 11 can be formed by printing a conductive ink by a silk-screen printing process, an offset printing process or a gravure printing process. The conductive ink is prepared by dispersing carbon particles, graphite particles, silver particles, aluminum foils or a mixture of some of those particles in a vehicle.

There are no particular restrictions on the shape of the antenna patterns 112. The antenna patterns 112 may be formed in a straight line, a coil or a pair of wings as shown in FIG. 10. The IC chip label 111a is bonded to the antenna patterns 112 on the base 210 so as to be electrically connected to the wing-shaped antenna patterns 112.

The IC chip label 111a is fabricated by attaching an IC chip 111 formed by fabricating an integrated circuit, a storage device or both an integrated circuit and a storage device in a silicon substrate to a tack label so as to be connected to the antenna patterns 112. The IC chi label 111a may be provided with a small antenna connected to the IC chip 111. More concretely, the IC chip label 111a is an interposer "Bistatix" commercially available from Motorola.

Generally, the IC chip label 111a is adhesively bonded to the antenna patterns 112 printed on the base 210. As shown in FIG. 10(B), the IC chip label 111a has a base sheet 120, and small antenna patterns 121 and 122.

As shown in FIG. 10(C), the antenna patterns 121 and 122 of the IC chip label 111a are bonded to the antenna patterns 112 formed on the base 210 with an adhesive 117, such as an anisotropic, conductive adhesive which is conductive only in a direction perpendicular to the antenna patterns 112, 121 and 122 or a nonconductive adhesive. The adhesive 117 is applied beforehand to the antenna patterns 121 and 122 of the IC chip label 111a to form a tack label.

The IC chip 111 has a recording capacity of 1024 bits for recording 128 characters, which are necessary for recording the least necessary information about an ordinary management label or a commodity package. If the IC chip 111 has a recording capacity of several kilobits, an amount of information greater than that can be expressed by a two-dimensional bar code can be recorded. The IC chip 111 is advantageous over a two-dimensional bar code in that necessary information can be additionally recorded therein and information recorded therein is rewritable.

Generally, an antitheft tag is not provided with any storage device because the antitheft tag is required only to resonate with a signal source. The RF-ID tag 11 is provided with a storage device and is capable of serving also as an antitheft tag.

Information recorded on the RF-ID tag 11 attached to a food package 22 will be examined.

It is more preferable to record a larger amount of information on the RF-ID tag 11 to be attached to the food package 22. However, since the RF-ID tag 11 has a limited recording capacity, a limited amount of information or data can be recorded on the RF-ID tag 11.

Generally, the followings are preferable pieces of information for food management.

(1) Storage date (month/date/year), (2) producer's name (producer code), (3) name of food (character string), (4) quantity of food (number of portions) (numerals), (5) cooking method (character string), (6) storage temperature range (code, A: cold storage, B: frozen storage), (7) time limit for consumption (month/date/year), (8) nutrients (character string describing calorie, fats, vitamins and the like), (9) repellents (character string describing allergy and invalid diet), and (10) category (dairy products, such as butter).

Storage date (month/date/year) of a food package 22 is entered automatically by the timer included in the refrigerator or the user enters the storage date by operating a keyboard when putting the food package 22 in the refrigerator. Therefore, the refrigerator may be provided with a numeric keypad.

Other data (2) to (10) are written to the RF-ID tag by the producer before shipping the food package 22. If the food contained in the food package 22 is processed by an intermediate processor, additional information may be recorded on the RF-ID tag by the intermediate processor.

Data on the category (data (10)) facilitates the retrieval of stocked foods. It is convenient to use food categories classifying foods into two to thee groups according to a food classification table.

EXAMPLES

Examples of practical uses of the refrigerated stock inquiry system will be described.

Use 1: Stock Confirmation During Shopping

Information about name, time limits for consumption, quantity and storage date of each of foods stored in the refrigerator 31 is retrieved from the refrigerator 31.

When a user 1M carrying the personal digital assistant 52 makes a purchase on the way home, the user 1M accesses the home server 15 through a mobile communication network or a telephone line to confirm the contents of the database 15a held by the refrigerator 31 (FIG. 9).

When the user 1M intends to see whether or not there is a stock of butter in the refrigerator 31 and does not remember the brand name of butter, the user 1M enters a category name "butter". Then, the home server 15 sends a list of the names, time limits of consumption, quantities and storage dates of stocked foods that can be described by the category name "butter" to the personal digital assistant 52. The list is displayed on the display 52a of the personal digital assistant 52. Then the user 1M consults the list to decide whether it is necessary to purchase butter.

Use 2: Stock Confirmation Before Coming Home

Information obtained from the refrigerator 31: storage date, manufacturer's name, product name, quantity, cooking method, time limit for consumption and such.

When the user 1M carrying the personal digital assistant 52 intends to make a purchase on his or her way home, the user 1M access the home server 15 through the mobile communication network or a telephone line to inquire of the database 15a about the recorded information.

The user 1M uses a category "processed food" as a keyword for checking the contents of the refrigerator 31. The database 15a sends a list of the storage dates, producer's names, product names, quantities cooking methods and time limits for consumption of stored foods described by the category "processed food" to the personal digital assistant 52.

Data thus given to the personal digital assistant 52 is displayed on the display 52a of the personal digital assistant 52. Thus the user 1M is able to know the contents of the stock and hence able to decide precisely whether or not any foods need to be purchased and what must be purchased on his or her way home with reference to the number of persons expected to sit down to dinner, cooking methods, the storage date and time limits for consumption of the foods in stock.

Although the foregoing examples of uses have been described only in connection with checking of the foods stored in the refrigerator 31, it will be obvious to those skilled in the art that various uses of the refrigerated stock inquiry system can be expected by incorporating various functions into the refrigerator 31.

For example, it is possible to make the refrigerated stock inquiry system propose menus which can be made up of the food of food packages 22 stored in the refrigerator 31, give advice on the nourishment and health of the family on the basis of the mode of consumption of food packages 22 in the past several months, give advice on the management of the family budget and food expenses on the basis of the amount of money spent for purchasing foods, give notice of excessively long storage of food packages 22 or propose menus which can be made up of the foods of only long stored food packages.

The refrigerator 31 according to the present invention provided with the RF-ID tag readers 12a, the RF-ID tag reader/writer 13a, and the database 15a containing food data read from the RF-ID tags is an intelligent refrigerator capable of giving necessary information to the user. The refrigerated stock inquiry system according to the present invention enables the user to obtain information about the food packages stored in the refrigerator through the mobile communication network or the like at a place where the user is staying, so that the user does not need to check food packages stocked in the refrigerator 31 beforehand and the user is able to make economical, proper purchase of foods.

Third Embodiment

An automatic cooking system in a third embodiment according to the present invention and a microwave oven will be described with reference to FIGS. 11 to 13.

The automatic cooking system according to the present invention uses noncontact IC tags which will be attached to various foods, particularly, home meal replacements (HMRS) and other processed foods in the future.

The microwave oven according to the present invention can be employed in the automatic cooking system and is provided with a noncontact IC tag reader and, preferably, a display device.

Automatic Cooking System

Figure 11:
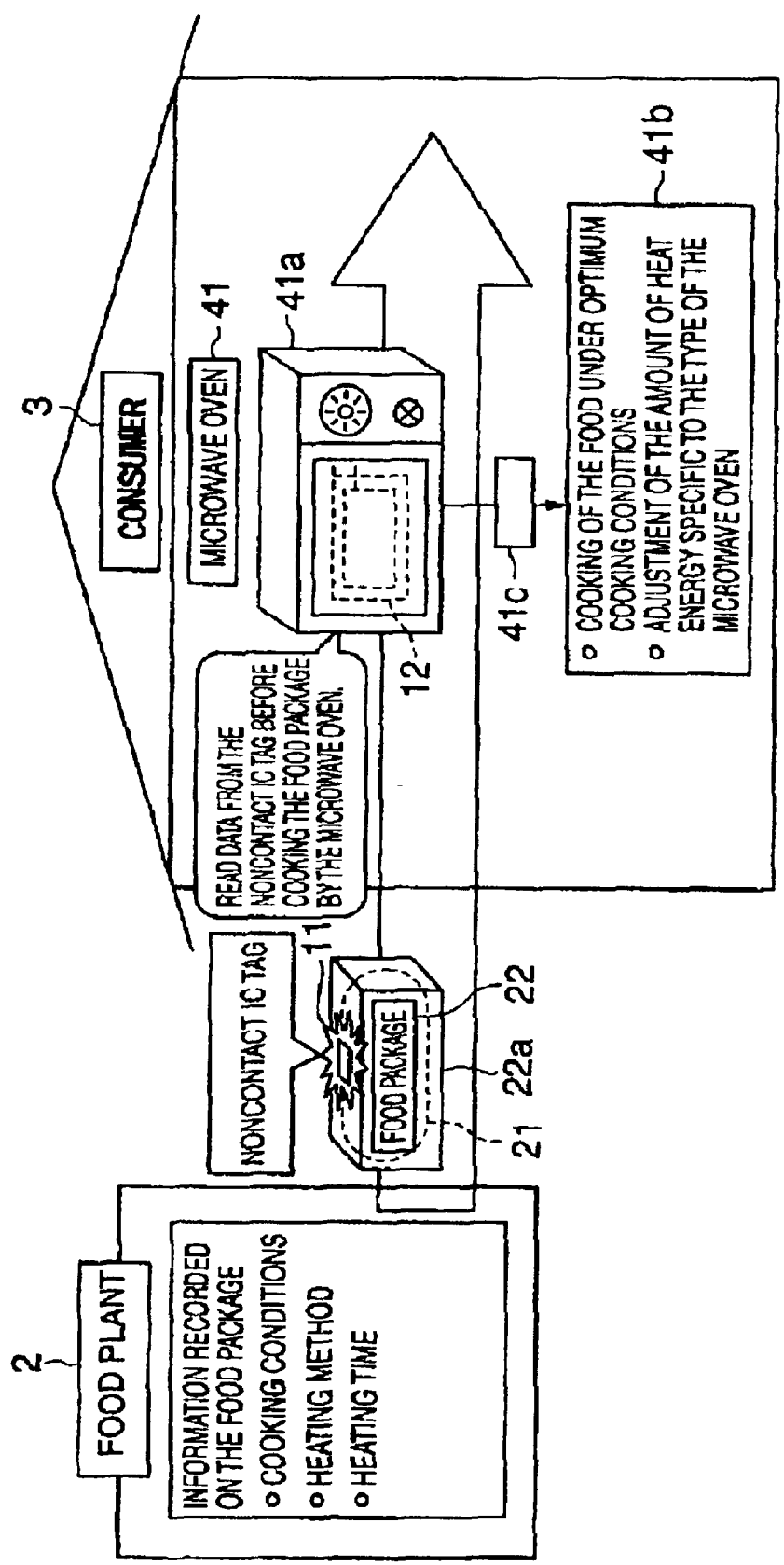
FIG. 11 is a block diagram of an automatic cooking system in a third embodiment according to the present invention.

FIG. 11 shows the automatic cooking system for cooking a processed food by way of example. A food package 22 produced by packaging a processed food 21 in a carton 22a is shipped from a food plant 2. A noncontact IC tag 11 is attached to the carton 22a of the food package 22. The food package 22 is delivered through a distribution system to a retail shop, and a consumer 3 purchases the food package 22 from the retail shop.

General data on the processed food 21 of the food package 22, such as product name, (kind), producer's name, manufacturing date, lot number and such, and cooking conditions for cooking the processed food 21 by the consumer's microwave oven 41 (heating method, heating time or heat applied to the food) are recorded in an IC storage device included in the noncontact IC tag 11 before shipping the food package 22 from the food plant 2.

Similar data is indicated on the food package 22. However, since a limited area is available on the food package 22 for indicating data, only limited data can be indicated on the food package 22. On the other hand, the upper limit of the amount of data that can be recorded on the noncontact IC tag 11 can be increased as much as it is necessary by providing the noncontact IC tag 11 with an IC storage device having a sufficient storage capacity.

When the automatic cooking system of the present invention cooks a food contained in the food package 22, a noncontact IC tag reader (sometimes referred to as "antenna") 12 included in the microwave oven 41 reads information automatically from the noncontact IC tag 11 attached to the food package 22.

The microwave oven 41 is provided with a database 41c containing information about foods read by the noncontact IC tag reader 12, a cooling means 41b which cooks the food package 22 on the basis of information contained in the database 41c, and a display device 14. The cooking means 41b controls the microwave oven 41 to cook the food package 22 under optimum cooking conditions on the basis of information contained in the database 41c. When cooking conditions are inappropriate, the cooking means 41b makes the display device 14 display a warning.

When cooking the food package 22 by the microwave oven 41, the automatic cooking system of the present invention corrects the variation of the magnetron output of the microwave oven 41.

The specific variation of the magnetron output of the microwave oven 41 is grasped. Data on heating conditions recorded in an IC chip 111 included in the noncontact IC tag 11 is an absolute value, such as "absolute quantity of heat" or "(quantity of heat)×(time)" and is not a simple relative value represented by time.

If microwave ovens of the same type have different outputs, heating time is corrected under the foregoing condition. Thus the correction, which is used to be made by using a temperature sensor, can be more accurately achieved.

The microwave oven 41 corrects heating time automatically according to its output capacity W (watt) and its type. Only data on a standard absolute quantity of heat determined by the food producer of the food package 22 and the electric appliance manufacture of the microwave oven 41 is recorded in the IC chip 111 of the noncontact IC tag 11 shown in FIG. 3. The microwave oven 41 corrects the data read from the IC chip 111 of the noncontact IC tag 11 with reference to a reference value to obtain a corrected value for the microwave oven 41.

Thus, the amount of information needed to be recorded on the noncontact IC tag 11 is reduced, the storage capacity of the storage device may be small and hence the cost of the noncontact IC tag 11 can be reduced.

The user does not need to set the microwave oven 41 for cooking time and cooking method every time the user uses the microwave oven 41 and needs only to operate a start switch 45 to achieve optimum cooking of the food. Thus complicated operations are omitted, troubles due to overheating can be prevented and the convenience of aged users, who have difficulty in reading instructions and indication, is improved.

The correction for the current microwave oven is subject to the initial temperature, specific heat, size and weight of the food to be cooked. The recent microwave oven is provided with a weight sensor and a temperature sensor to measure the initial condition of the food to be cooked. However, the temperature sensor and the weight sensor are not fundamentally effective measures to deal with the problems and it is practically impossible to correct automatically all the cooking conditions for various processed foods which are marketed one after another. When the absolute quantity of heat is used as a heating condition, variable conditions are reduced.

Generally, the information about the food recorded on the noncontact IC tag 11 attached to the food package 22 and to be read by the noncontact IC tag reader 12 includes: (1) name of food (character string), (2) quantity of food (number of portions) (numerals), (3) heating time, (4) heating condition, (5) time limit for consumption (month/data/year) and (6) time limit for relishing (month/data/year).

A time limit for consumption and a time limit for relishing are necessary for notifying the user that the food package has been stored beyond the time limit for storage and is not good for cooking. When necessary, data on (7) nutrients (character string describing calorie, fats, vitamins and the like) and (8) repellents (character string describing allergy and invalid diet) may be recorded on and read from the noncontact IC chip 11 to give a warning.

The hating time is expressed in minute and second for a reference output W (watt) or may be represented by a code, such as A: 30 sec, B: 45 sec or C: 60 sec. The code does not represent a heating time, and represents a level of absolute quantity of heat, which conforms to the object of the present invention. The representation of the heating time by the code saves the storage capacity of the noncontact IC tag 11, which contributes to the reduction of the cost of the noncontact IC tag 11.

The heating condition specifies microwave heating, electric heating, convection heating, forced heating using a fan or such. Those heating conditions may be represented by codes.

Time limit for consumption (month/date/year) is assigned principally to a perishable food to specify a preferable term for consumption and is, in most cases, a short time of two or three days after production. Time limit for relishing is assigned to a canned food or a boil-in-the-bag food having a comparatively long shelf life to specify a preferable term for relishing. Generally, a term limited by a time limit fore relishing for a canned food is as long as two years. There is the danger of food poisoning when a food stored beyond the time limit for consumption is eaten. The microwave oven 41 is capable of giving a warning not to eat such an old food to prevent food poisoning.

Each food package 22 is provided with a label, not shown, indicating data on the food 21 in conformity to the Food Hygiene Act and the like, and a time limit for relishing and storage conditions are indicated on the food package 22. As a rule, data corresponding to those indicated on the label is recorded on the noncontact IC tag 11 and, generally, additional data are recorded on the noncontact IC tag 11.

Figure 12:
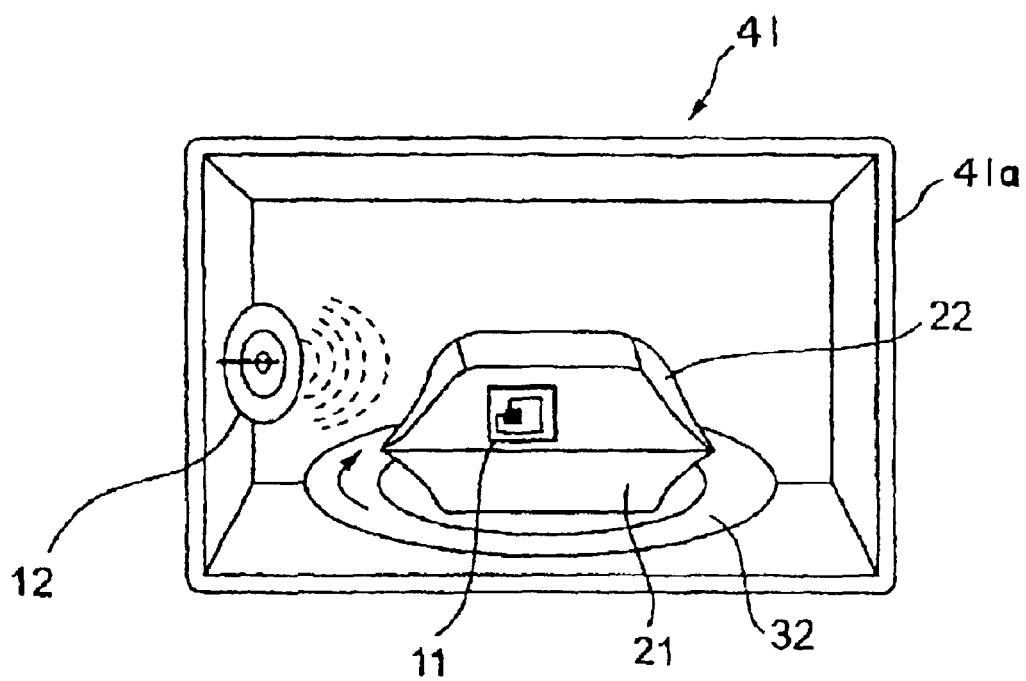
FIG. 12 is a schematic perspective view of a cooking chamber of a microwave oven.

Referring to FIG. 12 showing the interior of the microwave oven 41, the microwave oven 41 has an oven unit 41a, and a front door 41d capable of closing an open front side of the oven unit 41a. In FIG. 12, the front door 41d is opened.

Referring to FIG. 12, a food package 22 produced by packaging a food 21 in a carton 22a is placed in the microwave oven 41. A noncontact IC tag 11 is attached to the carton 22a of the food package 22. The noncontact IC tag reader 12 reads cooking information from the IC chip 111 of the noncontact IC tag 11. Normally, the microwave oven 41 cooks foods of the same kind at a time and does not cook foods of different kinds simultaneously.

Generally, optimum cooking conditions are indicated on the carton 22a of the food package 22 in recent years. The same optimum cooling conditions are recorded in the IC chip 111 and are read by the noncontact IC tag reader 12 to set the microwave oven 41 for the optimum cooking conditions. For example, when cooking a food package containing curried rice, i.e., a HMR, the microwave oven 41 is set for a cooking time of three minutes.

Similarly, the microwave oven 41 is set for a predetermined condition when thawing out a frozen food. The microwave oven 41 may be thus set for a cooking condition also when a food package 22 is put in the microwave oven 41 temporarily to make the noncontact IC tag reader 12 read information from the noncontact IC tag 11, the food package 22 is taken out of the microwave oven 41 and the food 21 taken out of the carton 22a is cooked.

The noncontact IC tag reader 12 for reading information from the noncontact IC tag 11 may be placed on the outer surface of the front door 41d and a noncontact IC tag reader/writer 13 may be placed on the outer surface of the oven unit 41a of the microwave oven 41.

When the noncontact IC tag reader 12 and the noncontact IC tag reader/writer 13 are thus disposed, the information can be read from the noncontact IC tag 11 simply by holding the food package 22 opposite to the noncontact IC tag reader 12 or the noncontact IC tag reader/writer 13. Consequently, the troublesome work for temporarily putting the food package 22 in the microwave oven 41 to read the information, taking out the food package 22 and putting the food 21 again in the microwave oven 41 after removing the carton 22a from the food 21 is not necessary.

The display device 14 for displaying cooking conditions is placed on the outer surface of the front door 41d.

After the microwave oven 41 has been set for the cooling conditions, the food package 22 placed on a rotary dish 32 disposed in the microwave oven 41 is irradiated with an electromagnetic wave for a predetermined cooling time.

Noncontact IC Tag

The noncontact IC tag 11 may be substantially the same as that shown in FIG. 3.

Generally, a radio wave of 125 kHz, 13.56 MHz, 2.45 GHz or 5.8 GHz (microwave) is used for operating the noncontact IC tag 11.

The noncontact IC tag 11 may be such as shown in FIG. 4.

Although the noncontact IC tag shown in FIG. 3 is a general-purpose noncontact IC tag, the noncontact IC tag 11 to be attached to a food package may be of a simpler configuration.

For example, the simple noncontact IC tag 11 as shown in FIG. 4 can be satisfactorily put to practical use. The noncontact IC tag shown in FIG. 4 is fabricated by printing an antenna pattern (antenna) 112 with a conductive ink on a wall of a carton, and mounting an IC chip 111 on the antenna.

The noncontact IC tag 11 shown in FIG. 4 can be fabricated by forming the antenna pattern 112 directly on a base 210 of a carton 22a by a silk-screen printing process, an offset printing process or a gravure printing process, and attaching an IC chip 111 mounted on a tack label to the antenna 112.

A noncontact IC tag 11 integrally including an antenna and a storage device may be mounted on a tack sheet and the tack sheet holding the noncontact IC tag 11 may be applied to a cardboard sheet or a soft packaging material for forming the carton 22a. The noncontact IC tag 11 can be attached to a molded carton by an in-mold labeling process in which the noncontact IC tag 11 is placed in a mold for molding the carton.

When cooking a food package 22 by a cooking method which uses both microwave heating and electric heating in combination, it is preferable to form the carton 22a of the food package 22 by folding a cardboard sheet. A package of a plastic material melts when heated, and a package of an aluminum foil sparks when subjected to microwave heating.

Microwave Oven

Figure 13:
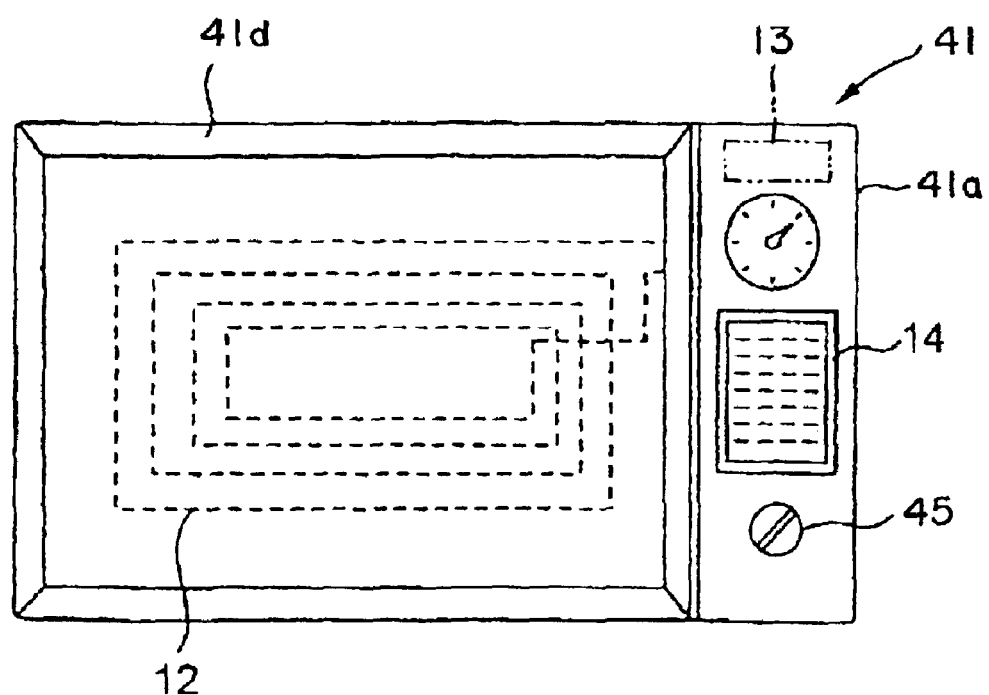
FIG. 13 is a front elevation of a microwave oven according to the present invention.

FIG. 13 shows the microwave oven 41 of the present invention.

The microwave oven 41 is provided with an antenna-type noncontact IC tag reader 12 in the oven unit 41a or on the outer surface of the front door 41d, or is provided with antenna-type noncontact IC tag readers 12 in the oven unit 41a and on the outer surface of the front door 41d.

In the microwave oven 41 shown in FIG. 13, a noncontact IC tag reader 12 is on the inner surface of the front door 31d.

Preferably, a display device 14 for displaying information read from a noncontact IC tag and warnings is placed on the oven unit 41a of the microwave oven 41.

Preferably, the display device 14 is a liquid crystal display capable of displaying information about a food being cooked, cooking conditions and necessary warnings.

The microwave oven 41 of the present invention is internally provided with the noncontact IC tag reader 12, and a mode selector switch 45 for selecting either an automatic control mode or a manual control mode. The microwave oven 41 is the same in other respects as ordinary microwave ovens.

The antenna-type noncontact IC tag reader 12 is provided with a scanning device capable of sending a radio wave of a frequency corresponding to the resonance frequency of the noncontact IC tag 11 to the noncontact IC tag 11, and of receiving response waves from the noncontact IC tag 11 attached to the food package 22 to read information from the noncontact IC tag 11.

The user puts a food package 22 provided with a noncontact IC tag 11 in the microwave oven 41. When the noncontact IC tag reader 12 is disposed on the front door 41d of the microwave oven 41, the user holds the food package 22 opposite to the front surface of the microwave oven 41. Thus the noncontact IC tag reader 12 reads information recorded on the noncontact IC tag 11.

Since radio waves are used for reading the information from the noncontact IC tag 11, the information can be read from the noncontact IC tag 11 without being affected by the atmosphere in which the food package 22 is placed, by the position and orientation of the food package 22 or by a cover.

When the antenna-type noncontact IC tag reader 12 is placed in the microwave oven 41, the antenna-type noncontact IC tag reader 12 is combined with a plastic molding by in-molding and is covered with a plastic film so that metal parts thereof are not exposed to prevent formation of sparks when the antenna-type noncontact IC tag reader 12 is exposed to electromagnetic radiation produced by a magnetron.

The antenna-type noncontact IC tag reader 12 may be of an electromagnetic induction system, an electromagnetic coupling system or an electrostatic coupling system depending on a communication system employed, or may be of a composite system.

The microwave oven 41 of the present invention is capable of using microwave heating and electric heating in combination and of carrying out a new cooking method which uses microwave heating and electric heating automatically alternately.

In such a case, predetermined cooking conditions are recorded beforehand on the IC chip 111 (FIG. 3) of the noncontact IC tag 11, the predetermined cooking conditions are read from the noncontact IC tag 11 and are added to the database 41c of the microwave oven 41.

The cooking information specifies, for example, a continuous microwave heating operation, a continuous electric heating operation, an intermittent microwave heating operation or an intermittent electric heating operation, or a combination of some of those heating operations. The microwave oven 41 is controlled automatically according to the cooking operation.

Thus, the user needs only to put a food in the microwave oven 41 for the optimum heating of the food by a new cooking method.

EXAMPLES

Use 1: Automatic Setting of Microwave Oven for Cooking Time

When printing data on a cardboard sheet (260 g/m²) and making a paper carton by processing the cardboard sheet, an antenna pattern 112 was printed with a conductive ink containing carbon particles by a silk-screen printing process on the inner surface of the cardboard sheet, and then the printed antenna pattern 112 was dried.

An IC chip (Bistatix, 1 kB, commercially available from Motorola) mounted on a tack sheet was attached to the paper carton so that the IC chip is electrically connected to the terminals of the antenna pattern 112 to complete a carton 22a provided with the noncontact IC tag 11 as shown in FIG. 4.

A processed food 21 was packaged in the carton 22a to produce a food package 22. Cooking data representing cooking time and cooking method, such as microwave heating: 500 W×3 min and electric heating: 600 W×2 min 30 s, was written to the noncontact IC tag 11. The food package 22 was held opposite to the noncontact IC tag reader/writer 13 placed on the front door 41d before putting the food package 22 in the microwave oven 41 for cooking to read the cooking data from the noncontact IC tag 11. The cooking means 41b operated and controlled the magnetron of the microwave oven 41 to heat the food package 22 by a heating method specified by the cooking data.

The microwave oven 41 read a time limit for consumption from the noncontact IC tag 11 and displayed that the food package 22 has not been stored beyond the time limit for consumption on the display device 14.

Use 2: Automatic Cooking Method Using Microwave Heating and Electric Heating

A carton 22a provided with a noncontact IC tag 11 was made by a method similar to that of making the carton 22a for Use 1.

A frozen food (such as a gratin) 21 was packaged in the carton 22a to produce a food package 22. Cooking data representing a heating method, cooking time and a combination of heating methods, such as microwave heating: 500 W×3 min, electric heating: 600 W×2 min 30 s, microwave heating method: thawing-heating and electric heating method: surface-burning heating, was written to the noncontact IC tag 11.

All the food makers concerned must use a standardized notational system for writing the data to the noncontact IC tag 11.

The food package 22 was held opposite to the noncontact IC tag reader/writer 13 placed on the front door 41d before putting the food package 22 in the microwave oven 41 for cooking to read the cooking data from the noncontact IC tag 11. The cooking means 41b operated and controlled the magnetron and the electric heater of the microwave oven 41 to heat the food package 22 by a heating method specified by the cooking data.

Thus a grilled gratin was finished.

As apparent from the foregoing description, in the automatic cooking system and the microwave oven according to the present invention, the microwave oven reads information recorded on the noncontact IC tag attached to the food package and cooks the food package according to the information read from the noncontact IC tag. Therefore, faulty cooking resulting from the user's faulty setting of cooking conditions is avoided and the food can be cooked under optimum cooking conditions without fail. Since the difference in output of the microwave oven from a reference output is corrected, a microwave oven of any type is able to achieve proper heating.

The noncontact IC tag employed n the foregoing embodiments may be substituted by a RE-ID tag, and the RE-ID tag employed in the foregoing embodiments may be substituted by a noncontact IC tag.

What is claimed is:

1. An automatic cold-storage system comprising:
   a food package provided with a noncontact IC tag storing information about a food contained in the food package, and
   a refrigerator for storing the food package;
   wherein the refrigerator is provided with a noncontact IC tag reader for reading the information from the noncontact IC tag, and the refrigerator has a managing means for cold-storing the food package under optimum cold-storing conditions on the basis of information read from the noncontact IC tag by the noncontact IC tag reader.

2. The automatic cold-storage system according to claim 1, wherein
   the refrigerator is provided with a display device, and the managing means makes the display device display information on the basis of the information about the food recorded on the noncontact IC tag.

3. The automatic cold-storage system according to claim 2, wherein
the information about the food includes a time limit for consumption and a time limit for relishing the food, and the managing means makes the display device give a warning when the time limit for consumption or the time limit for relishing is drawing.

4. The automatic cold-storage system according to claim 2, wherein
the information about the food includes a time limit for consumption, a time limit for relishing the food and a quantity of the food, and the managing means makes the display device display proposed menus or proposed articles to be purchased on the basis of the information about the time limit for consumption, the time limit for relishing and the quantity of the food.

5. An automatic cold-storage system comprising:
a food package provided with a noncontact RF-ID tag storing information about a food contained in the food package, and
a refrigerator for cold-storing the food package;
wherein the refrigerator is provided with a noncontact RF-ID tag reader for reading the information from the RF-ID tag, and a database containing information read by the noncontact RF-ID tag reader, and
the information contained in the database can be read by an external personal digital assistant.

6. The automatic cold-storage system according to claim 5, wherein
the information contained in the database is read through a mobile transmission network or the Internet.

7. A refrigerator for containing and cold-storing a food package provided with a noncontact IC tag, comprising:
a noncontact IC tag reader for reading information from the noncontact IC tag, and
a managing means for cold-storing the food on the basis of information read from the noncontact IC tab by the noncontact IC tag reader under optimum conditions.

8. The refrigerator according to claim 7 further comprising a display device;
wherein the managing means makes the display device display information on the basis of information about the food and storage conditions recorded on the noncontact IC tag.

9. The refrigerator according to claim 8, wherein
the information about the food includes a time limit for consumption and a time limit for relishing the food, and
the managing means makes the display device display the information when the time limit for consumption or the time limit for relishing is drawing.

10. The refrigerator according to claim 8, wherein
the information about the food includes a time limit for consumption, a time limit for relishing and the quantity of the food, and
the managing means makes the display device display proposed menus or proposed articles to be purchased on the basis of the information about the time limit for consumption, the time limit for relishing and the quantity of the food.

11. The refrigerator according to claim 7 further comprising:
a database containing information read by the noncontact IC tag reader.

12. A refrigerator for containing and cold-storing a food package provided with a noncontact RF-ID tag storing information about a food contained in the food package, comprising:
a refrigerating unit,
a reader attached to the refrigerating unit and capable of reading information from the noncontact RF-ID tag, and
a database containing information read by the reader.

13. The refrigerator according to claim 12 further comprising a display device for displaying information read from the database.

14. The refrigerator according to claim 12, wherein
the database is included in a home server or a personal computer.

15. The refrigerator according to claim 12, wherein
the reader is attached to an outer surface of the refrigerating unit and is capable of reading and writing operations.

16. The refrigerator according to claim 12, wherein
the reader is disposed inside the refrigerating unit.

* * * * *